(12) United States Patent
Deveaud

(10) Patent No.: US 6,266,725 B1
(45) Date of Patent: *Jul. 24, 2001

(54) COMMUNICATIONS PROTOCOL FOR ASYNCHRONOUS MEMORY CARD

(75) Inventor: Vincent Deveaud, Trets (FR)

(73) Assignee: STMicroelectronics S.A., Gentilly (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,644

(22) Filed: May 26, 1998

(30) Foreign Application Priority Data

May 30, 1997 (FR) .................................................. 97 06702

(51) Int. Cl.$^7$ ............................. G06F 13/42; G05B 13/02
(52) U.S. Cl. ............................................. 710/105; 711/100
(58) Field of Search .................................. 710/62, 72, 1, 710/104, 105; 711/1, 170, 100; 709/203, 253; 235/375, 380; 455/115; 379/357, 90.1; 375/370, 222; 439/43; 370/464; 340/825.06

(56) References Cited

U.S. PATENT DOCUMENTS

| | | | |
|---|---|---|---|
| 5,327,570 | * | 7/1994 | Foster et al. . |
| 5,414,835 | | 5/1995 | Iijima .......................................... 710/1 |
| 5,473,666 | * | 12/1995 | Szczebak, Jr. et al. . |
| 5,533,204 | | 7/1996 | Tipley ................................... 710/108 |
| 5,598,540 | * | 1/1997 | Kruegar . |
| 5,742,502 | * | 4/1998 | King . |
| 6,012,634 | * | 1/2000 | Brogan et al. . |

FOREIGN PATENT DOCUMENTS

| | | | |
|---|---|---|---|
| 2 705 811 | 5/1993 | (FR) | ............................. G06K/19/073 |
| 96/38804 | 12/1996 | (WO) | ............................... G06K/7/00 |

* cited by examiner

Primary Examiner—Gopal C. Ray
(74) Attorney, Agent, or Firm—Theodore E. Galanthay; Allen, Dyer, Doppelt, Milbrath & Gilchrist, P.A.

(57) ABSTRACT

In a method of communications between a host system and a memory card with an asynchronous transmission protocol, a message from the card is sent out in response to a control instruction comprising a character or a sequence of several characters in a predetermined format. The protocol is modified so as to have the dispatch of each message or of each character of a message preceded by a detection, by the card, of a response request instruction sent out by the host system.

15 Claims, 2 Drawing Sheets

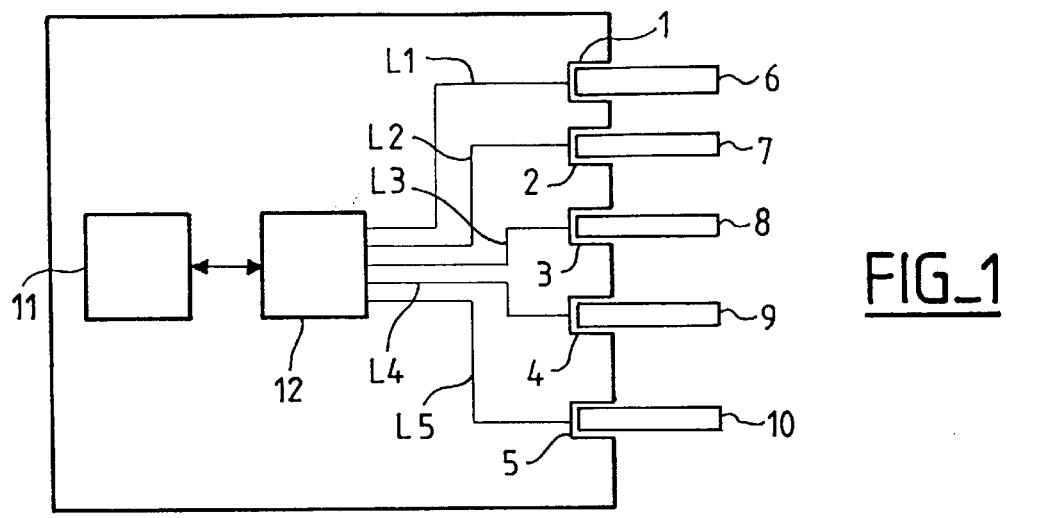
FIG_1
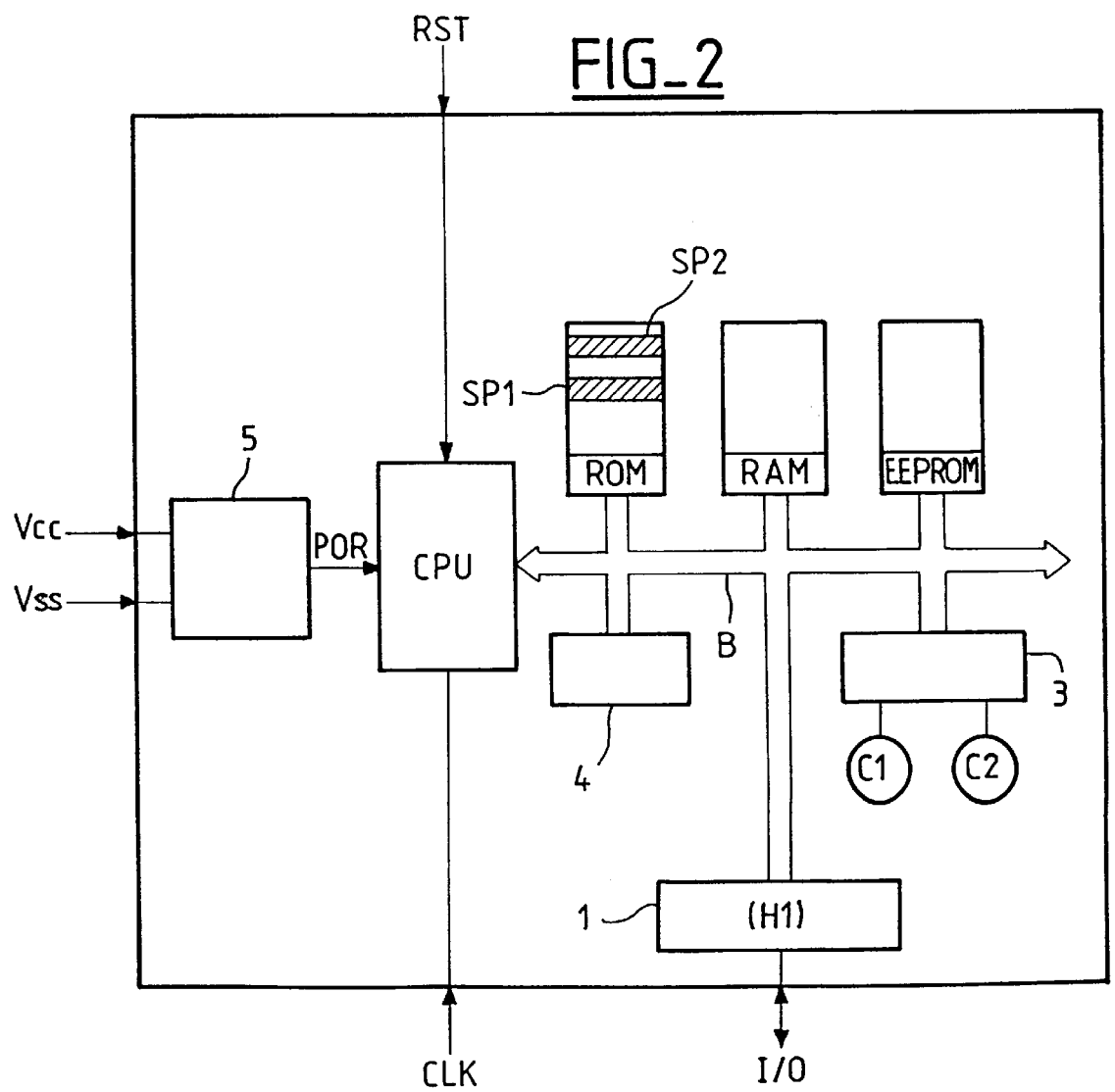
FIG_2

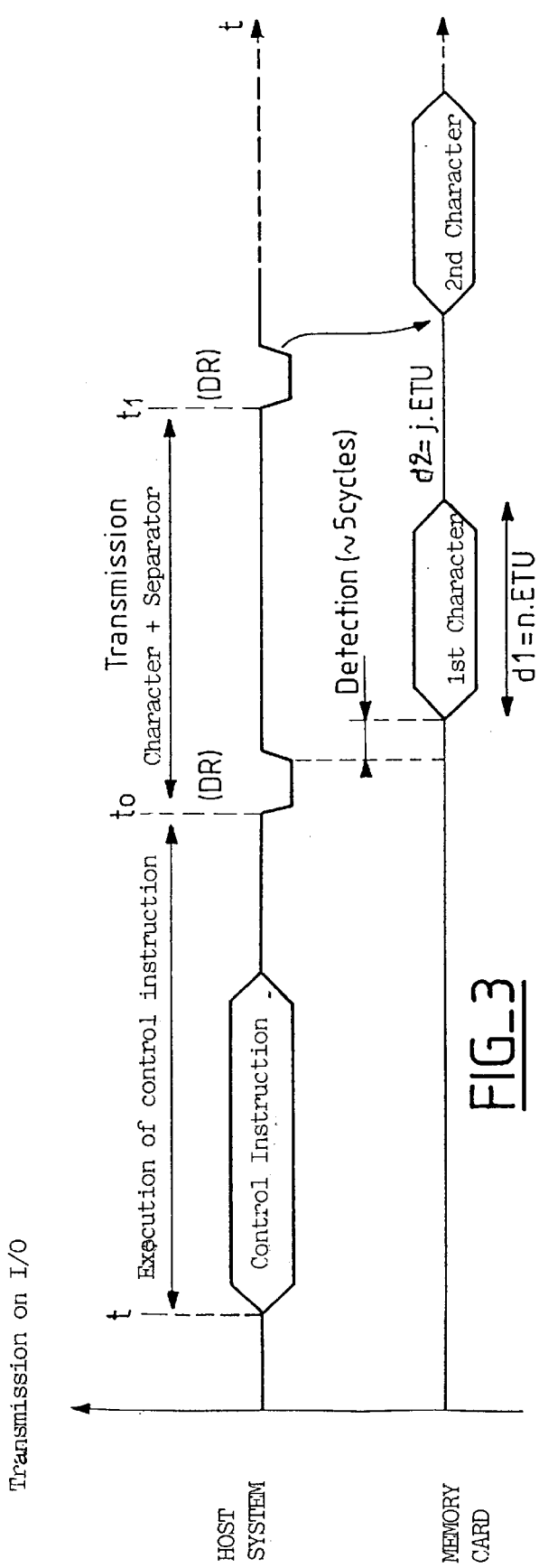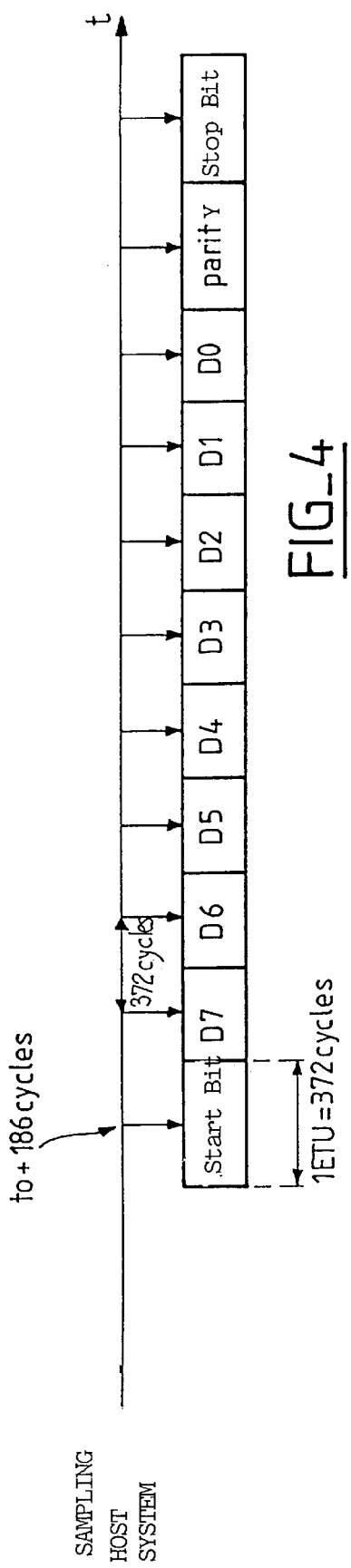

COMMUNICATIONS PROTOCOL FOR ASYNCHRONOUS MEMORY CARD

FIELD OF THE INVENTION

The invention relates to a communications protocol for asynchronous memory cards. It can be applied in particular to the testing, as well as to the resetting, of such memory cards.

BACKGROUND OF THE INVENTION

The term "memory card" is understood to mean a card comprising at least one integrated circuit chip embedded in the material of the card and mounted on a flush connector meeting the ISO standard 7816. This connector has five to six standardized contacts. These contacts are the contacts for the electrical ground GND, the logic supply VCC (+3 or +5 volts), the resetting of the card RST, the clock signal CLK, the data input/output I/O and, for certain cards, the programming voltage Vpp (10 to 21 volts). These contacts enable serial transmission on the line I/O. This transmission is more particularly set forth in part 7816-3 of the standard. Variants to this standard exist, especially with cards using I2C bus memories. The transmission bit rate is currently 9,600 to 19,200 bps. However, certain cards have bit rates of 115,200 bps and higher.

A distinction can be made between two major classes of memory cards, one using synchronous transmission and the other using asynchronous transmission. Synchronous transmission is generally that of simple or secured memory cards. The rate of input/output of the bits is directly set by the clock signal CLK with sequential access in the rising order of their addresses.

The asynchronous memory cards are mostly microprocessor cards. The transmission is done by a byte or block of bytes on the input/output line I/O. It is for the host system of the memory card to monitor this line to detect the reception of a message transmitted by the card. It is a general characteristic of asynchronous transmission, whatever the protocol used, that it meets the standard 7816 or other standards.

The term "host system" is understood to mean the card reader of a sales point or money dispenser, portable telephone, television decoder or any other system that communicates with the memory card presented to it. To enable communications between a host system and a memory card which, in practice, may come from various manufacturers and issuing parties, the protocols incorporate the dispatching of an ATR (Answer to Reset) message by the card in response to a resetting signal (RST signal activated). The contents of the ATR message identify the card with respect to type (simple memory, microprocessor memory or the like), its protocol, whether or not a programming voltage Vpp is needed, with the value of this programming voltage as the case may be (10, 15, 21 volts). The contents may also include any information by which the host system can configure itself appropriately so as to communicate with the card that is presented to it.

The asynchronous transmission protocols are thus well suited to applications of memory cards where a host system has to deal with only one memory card at a given time, namely the card that is presented to it. This is the case for applications such as payment, telecommunications, subscriber television, customer loyalty cards, etc.

When it comes to the testing of memory cards coming off the production line or that have been subjected to the customization carried out on cards that this test has deemed to be suitable, the protocols prove to be highly disadvantageous. Indeed, it is not possible to process several cards in parallel, since the host system is captive to each card which is the master of the communication once it has transmitted its response. The host system must, therefore, scrutinize the corresponding line I/O for each character to be received. Since in testing a large quantity of information has to be transmitted between the host system and the card, this process may be very slow.

This is true not only for the testing, but also for the customizing of the cards. Customizing includes programming of a flow of data elements with a few hundreds or thousands of bytes, most of which correspond to a trunk common to all the cards, with a minority of data elements, whose number can be estimated at some tens to some hundreds of bytes, being specific to each card. The testing and customization of a card may thus take from ten seconds to several tens of seconds. The host system, which is a testing or programming system, can therefore process only one card after another. This serial processing results in an excessively lengthy time for the testing and customization of a batch of cards, making this end-of-manufacturing step highly penalizing from the viewpoint of manufacturing times, even if several testers and programmers are provided.

SUMMARY OF THE INVENTION

It is an object of the invention, therefore, to reduce the time taken for the testing and customization of memory cards with asynchronous transmission protocols.

On the basis of the observation that, in the case of testing or customization, the host system (the tester or programmer) knows the characteristics of the card that it processes, means has been sought to make use of this knowledge to enable the simultaneous parallel processing of the cards.

The means have been found, in accordance with the invention, in a communications method according to which instead of scrutinizing the line I/O pending a response, the host system sends the card a request for a response. After a previously received control instruction has been executed, it is the card that will scrutinize the line I/O pending this request for a response. When it has detected this request for a response, it prepares and sends its response.

The host system knows what time is needed to carry out the instruction and sends its request for a response when this time has elapsed, and then positions itself (in a sampling state) to receive the message. In the testing mode, this enables the host system to check the periods of time taken to execute the control instructions (resetting, reading, programming, comparison or the like). In programming mode, this enables it to have an optimum programming duration. In being made the master at the time when the message of the response is dispatched, the host system is enabled to process several cards simultaneously, in parallel.

The method of communications according to the invention is based on the asynchronous transmission protocol implemented by the card by means of an operational executable sub-program, stored in memory in the card, to make a modified executable sub-program integrating the response request instruction to be received before any dispatch on the line I/O. This modified executable sub-program is also stored in memory in the card. It is possible to plan that, at the outset, and depending on manufacture, the active sub-program will be the modified sub-program used for the testing. If the card is found to be the right card, the step of customizing the card provides for the invalidating of this modified executable sub-program so that its place is taken by the first one which is the operational sub-program. This invalidation can be done by the blowing of access fuses, for example, or by the recording of any non-degradable data element (by means of memory cells for example). In one variant, the modified executable sub-program is activated by a test mode signal for example, and then deactivated as above to make the operational executable sub-program active.

In other words, the invention therefore relates to a method of communications between a host system and a memory card with an asynchronous transmission protocol. A message from the card is sent out in response to a control instruction comprising a character or a sequence of several characters in a determined format. According to the invention, the protocol is modified so as to have the dispatch of the message or of each character of the message preceded by a detection by the card of a response request instruction (DR) sent out by the host system.

BRIEF DESCRIPTION OF THE DRAWINGS

Other features and advantages of the invention are presented in the following description given by way of an indication that does not restrict the scope of the invention, with reference to the appended drawings, of which:

FIG. 1 shows a drawing of a host system to process several memory cards simultaneously, FIG. 2 shows a block diagram of a memory card according to the invention, FIG. 3 shows an example of data sequences sent out on the line I/O by the host system and by the card according to the communications method of the invention, and FIG. 4 shows an exemplary format of characters and the corresponding sampling by the host system.

DETAILED DESCRIPTION OF THE PREFERRED EMBODIMENTS

FIG. 1 shows a host system according to the invention comprising several connectors 1 to 5 each to receive and connect to a respective memory card 6 to 10. Each connector is connected to computer type processing means 11 by input/output peripheral links L1 to L5 and a relay and routing circuit (with sampling) 12.

A block diagram of a memory card is shown in FIG. 2 by way of an example. The memory card shown has a microprocessor CPU and different memories. A ROM memory typically includes the program executable by the microprocessor. A volatile RAM contains data elements received from the input/output line I/O, data elements on which computations or other operations have to be executed, or again message data to be transmitted on the input/output line I/O. An EEPROM conventionally contains data for the customization of the card (type, issuing number, serial number, personal card, etc.), data elements, or application programs. The input/output line I/O is managed by an interface circuit 1 which converts the information elements received on the line into data elements that are acceptable by the CPU.

The rate of transmission is set at a clock frequency H1, generally a sub-multiple of the clock frequency CLK applied to the card. A safety logic circuit 3 is shown, coupled to different sensors C1, C2 for the control, for example, of the clock frequency or again the level of the logic supply voltage Vcc. The list of possible controls is not exhaustive.

An auxiliary computation circuit 4 has also been shown. It may, for example, be a multiplier to carry out specific computations on data elements. All these memory resources, namely the auxiliary computation circuit 4, safety circuit 3 or input/output interface are accessible by the microprocessor CPU by means of an address and data bus B. The resetting signal RST is applied directly to the microprocessor CPU. Finally, a resetting circuit 5 is planned to provide a resetting signal POR, especially applied to the microprocessor to reset it upon the detection of an operation for powering or repowering the card.

It has been seen that the memory ROM is designed to contain the program executable by the card. It contains in particular data elements corresponding to an executable sub-program SP1 pertaining to the asynchronous transmission protocol used by the card to detect instructions to be executed and transmit corresponding responses in a well defined format. We may take the example of a protocol identified by the code T=1 according to the standard 7816-3, also called a block protocol. A message consists of a character or a sequence of characters. Each character is transmitted in a determined format shown in FIG. 4, comprising a synchronization bit (start bit) followed by a byte of data elements to be transmitted (8 bits), a parity bit, and finally one or more stop bits. Each transmitted bit has the same length referenced ETU (Elementary Time Unit) and the start bits of two consecutive characters of a message must be separated by an interval equal to j•ETU, where j is equal to 0•ETU at the minimum.

The synchronization bit (start) that is found in all the asynchronous protocols enables the host system which scrutinizes the input/output line I/O to detect the beginning of a character. When it detects this synchronization bit, it can position itself to sample the following bits of the character in taking position in the middle of each of the data bits to determine its value. At each received bit, the parity bit is recomputed by the host system so that it is possible, at the end, to compare the computed parity bit with the parity bit transmitted on the line to reject the character when these bits do not correspond (because the character has been wrongly read).

The executable sub-program SP1 makes it possible to set up a correspondence between, on the one hand, each control instruction received by the card and, on the other hand, an instruction to be executed and a corresponding response message to be sent. After having sent a resetting request by the activation of the signal RST or an instruction for reading, writing, comparison or the like, through the dispatch of an instruction message on the line I/O, the host system scrutinizes its input/output line I/O to detect a synchronization bit (start) of the corresponding response message sent by the card. When it detects this synchronization bit, it can sample the following bits according to the procedure described here above.

According to the invention, a second executable sub-program SP2 is planned, memorized in ROM. This sub-program corresponds to the previous asynchronous transmission protocol, but is modified to manage an additional response request instruction DR. More specifically, this second sub-program SP2 is such that the execution of a control instruction comprises an additional step before the dispatch of the response message. Each additional step consists of a wait for reception, on the line I/O, of a response request instruction DR sent by the host system before a message or a character of the message is sent. An operation of this kind according to the invention is shown in FIG. 3 in schematic form. With the second sub-program SP2, the memory card takes position in a loop of waiting for a response request instruction DR before the dispatch of the response message or of each character of this message. As soon as it has been able to detect this instruction DR, it sends the first message or a character of the message in the format of the asynchronous protocol (start bit, byte, parity bit and stop bit(s)), and then returns to the loop of waiting for an instruction DR.

In a practical use of the communications method according to the invention, whether it is for the testing or the customizing of the card, the host system knows the characteristics of the card that it has to process: ETU duration, maximum period of execution of an instruction do, time interval j•ETU between two characters, as well as the number of characters of each of the messages expected.

Thus, when it resets the card or sends a particular control instruction to the card (reading, etc.), it counts out the maximum corresponding duration of execution do and then sends a response request DR at the point of termination t0 of this duration as shown schematically in FIG. 3. When the host system sends a response request DR for each character, the card detects this request (for example a level zero on several clock cycles). It then sends the first character of the message, in the format of the asynchronous protocol, namely in the example, start bit, byte, parity bit, stop bit. The host system for its part, after having sent its response request DR, takes position in the middle of a first bit to be received and then the second bit etc. until it has the complete character. For example, if the period ETU is equal to 372 clock cycles H1 (default duration determined by the standard ISO 7816), it activates the sampling at t0+372/2 cycles for the first bit which herein is the synchronization bit and then it samples all 372 cycles. If the received character is not the one expected, it means that the card is defective.

At the same time, the host system counts down the transmission time of a character, equal to n•ETU, n being the number of bits of the character, plus the time interval between the transmission of two consecutive characters, namely j•ETU, to send a second request DR. It then samples the second character as described here above. The transmission sequence, if the card sends the message (and no longer a single character) in reply to the response request DR, is easily deduced by analogy. The host system is thus the master of the reception and may synchronize the reception of all the cards that it has to process in parallel, simultaneously. The activation of one sub-program or the other may be done by means of fuses or other indicators (for example by an EEPROM cell or a combination of EEPROM cells) which will reroute the management address of the transmission protocol to one sub-program or other depending on circumstances.

It can thus be planned that the sub-program SP2 will be active when the card comes off the production line. After the card has been validated by the tester, it is planned, in the next step, to blow fuses or position any other type of indicator capable of activating the sub-program SP1 and deactivating the sub-program SP2.

The response request DR sent by the host system may take any form that can be detected by the card. In one example of cards, it may be a zero level held for a few clock cycles H1, for example, 10 cycles. The character format is unchanged. In the example, it includes the synchronization bit (start), the byte, the parity bit and the stop bit(s). This is of course only an example of a format given by way of indication. The application of the invention is not limited to this format.

To further improve the performance characteristics of the communications method according to the invention, it is possible, in one variant, to plan to eliminate the synchronization bit in the character transmitted by the card with the sub-program SP2. Indeed, this synchronization bit no longer has any purpose with this method. The testing and customization time are thereby reduced.

Depending on the complexity of the host system, the invention thus enables this system:
  to be in contact simultaneously by N input/output lines with-N cards all performing the same instructions, thus making it possible to identify the defective card and isolate it for the following tests;
  to be in contact at times with N cards simultaneously and, at other times, with only one of them, the others being in a waiting state, either because the tester has not drawn any response or because these cards are logically disconnected from the host system and have not received any command.

By using appropriate multiplexing means between the host system (tester) and the N cards, it is possible to achieve the parallel performance of the tasks generating identical responses in all the cards (if they are in "good condition"), and then isolate each card successively to carry out differentiated sequences, before returning again to a parallel operation, if necessary, as a typical example.

That which is claimed is:

1. A method of communications between a host system and a memory card comprising the steps of:
  forwarding a control instruction by the host system to the memory card in accordance with an asynchronous transmission protocol;
  forwarding a message from the memory card to the system, comprising a character or sequence characters in a predetermined format in response to the control instruction; and
  modifying the asynchronous transmission protocol so as to have dispatch of the message preceded by a detection, by the memory card, of a response request instruction sent out by the host system.

2. A method of communications according to claim 1, wherein the response request instruction is sent out after a predetermined duration following dispatch of a control instruction by the host system; and wherein the predetermined duration corresponds to a duration of execution of the control instruction.

3. A method of communications according to claim 2, wherein the response request instruction is sent out for each following character to be received; and wherein a time interval between two response request instructions corresponds at a minimum to a duration of transmission of a character plus a time interval separating the sending out of two characters according to the asynchronous transmission protocol.

4. A method of communications according to claim 1, wherein the asynchronous transmission protocol includes a synchronization bit; and further comprising the step of eliminating the synchronization bit at a beginning of each character to be transmitted.

5. A method of communications between a host system and a memory card with an asynchronous transmission protocol where a message from the memory card, comprising a character or sequence characters in a predetermined format, is sent out in response to a control instruction, the method comprising the. step of:
  modifying the asynchronous transmission protocol so as to have dispatch of the message preceded by a detection, by the memory card, of a response request instruction sent out by the host system; and wherein the response request instruction is sent out after a predetermined duration following dispatch of a control instruction by the host system.

6. A method of communications according to claim 5, wherein the predetermined duration corresponds to a duration of execution of the control instruction.

7. A method of communications according to claim 5, wherein the response request instruction is sent out for each following character to be received; and wherein a time interval between two response request instructions corresponds at a minimum to a duration of transmission of a character plus a time interval separating the sending out of two characters according to the asynchronous transmission protocol.

8. A method of communications according to claim 5, wherein the asynchronous transmission protocol includes a synchronization bit; and further comprising the step of eliminating the synchronization bit at a beginning of each character to be transmitted.

9. A memory card that uses asynchronous transmission and comprising:
   a data input/output line; and
   a memory for storing a first executable sub-program corresponding to an asynchronous transmission protocol, the first executable sub-program for transmitting a message from the card onto the data input/output line in response to a control instruction received on the data input/output line, the message comprising a character or a sequence of several characters in a predetermined format;
   said memory also for storing a second executable sub-program, the second executable sub-program for modifying the asynchronous transmission protocol so as to have dispatch of the message preceded by a detection, by the memory card, of a response request instruction sent out by a host system; and
   control means for activating the second executable sub-program in at least one predetermined operating mode and deactivating the second executable sub-program otherwise.

10. A memory card according to claim 9, wherein the control means comprises means for activating the second executable sub-program in at least one of a testing mode and a customizing mode.

11. A memory card according to claim 9, wherein the asychnchonous transmission protocol includes a synchronization bit; and further comprising means for eliminating the synchronization bit at a beginning of each character to be transmitted.

12. A memory card for communicating with a host system using an asynchronous transmission protocol where a message from the memory card, comprising a character or sequence characters in a predetermined format, is sent out in response to a control instruction, the memory card comprising:
   an input/output line to be connected to the host system;
   means for modifying the asynchronous transmission protocol so as to have dispatch of the message over the input/output line preceded by a detection of a response request instruction sent out by the host system.

13. A memory card according to claim 12, wherein the asychnchonous transmission protocol includes a synchronization bit; and further comprising means for eliminating the synchronization bit at a beginning of each character to be transmitted.

14. A memory card according to claim 12, wherein said means for modifying comprises a memory storing a second executable sub-program and a controller associated therewith.

15. A memory card according to claim 14, wherein said controller comprises means for activating the second executable sub-program in at least one of a testing mode and a customizing mode.

* * * * *